United States Patent [19]

Hertel

[11] Patent Number: 4,697,919

[45] Date of Patent: Oct. 6, 1987

[54] FILM DEVELOPING SYSTEM FOR MICROIMAGE RECORDING APPARATUS

[75] Inventor: Heinz E. Hertel, Mount Prospect, Ill.

[73] Assignee: Bell & Howell Company, Chicago, Ill.

[21] Appl. No.: 935,875

[22] Filed: Nov. 28, 1986

[51] Int. Cl.[4] .................... G03B 17/50; G03B 27/32; H05B 1/00

[52] U.S. Cl. .................... 355/27; 219/216; 354/299

[58] Field of Search .................... 355/27-29, 355/43, 100; 219/216, 388; 354/299

[56] References Cited

U.S. PATENT DOCUMENTS

| | | | |
|---|---|---|---|
| 3,177,793 | 4/1965 | Stewart | 354/299 |
| 3,264,961 | 8/1966 | Tuttle et al. | 355/27 X |
| 3,318,219 | 5/1967 | Anderson | 355/100 |
| 3,349,222 | 10/1967 | Johnston | 219/388 |
| 3,478,665 | 11/1969 | Umahashi et al. | 219/388 |
| 3,902,041 | 8/1975 | May | 219/216 |
| 4,123,157 | 10/1978 | Klose et al. | 355/43 |
| 4,275,959 | 6/1981 | Jones | 219/216 |
| 4,278,338 | 7/1981 | Baker et al. | 219/216 |
| 4,332,466 | 6/1982 | Flasck | 355/27 |
| 4,382,675 | 5/1983 | Marshall | 355/43 |
| 4,501,487 | 2/1985 | McCormick-Goodhart | 355/27 |

*Primary Examiner*—Donald A. Griffin

*Attorney, Agent, or Firm*—Neal C. Johnson; Philip C. Peterson; Stanley J. Tomsa

[57] ABSTRACT

A film developing system for a microimage recording apparatus of the type including an elongated film strip movable under tension along a film path. The film strip is of the type utilizing heat for developing latent image areas formed at an exposure station, and the improved developing station includes a support for holding the film strip between spaced apart support elements extending transversely across the film strip on opposite sides of a previously exposed latent image area. A developer shoe having an outwardly convex heated surface is adapted to contact a facing surface of the film strip between the supports for developing the latent image area. The developer shoe is mounted for movement between a first position spaced away from the film path and a second position wherein the film strip is tensioned to conform to the heated surface of the shoe for developing during a selected time period. A back-up assembly is provided between the supports including a collector spaced from and adjacent to an opposite surface of the film strip for enclosing the developing area and retaining any gases generated and for conserving the heat generated by the developer shoe while in contact with the film strip. The back-up assembly includes a peripheral seal and a replaceable collection element adapted to collect and retain any residue that may be formed on the film strip at the developing station during heated contact with the developer shoe.

20 Claims, 7 Drawing Figures

FILM DEVELOPING SYSTEM FOR MICROIMAGE RECORDING APPARATUS

BACKGROUND OF THE INVENTION

1. Field of the Invention

The present invention relates to micrographics generally, and more particularly to improvements in a developing station for a microimage recorder wherein heat is used to develop a latent image area on the film strip formed by a computer generated output applied to the strip at an exposure station. The film developing system of the present invention is an improvement on the system disclosed in copending U.S. patent application Ser. No. 787,898, filed Oct. 16, 1985, assigned to the same assignee as the present invention and now U.S. Pat. No. 4,653,890 issued Mar. 31, 1987.

2. Description of the Prior Art

U.S. Pat. Nos. 4,123,157; 4,332,466; 4,382,675 and 4,501,487 disclose various microimage recorders wherein images are exposed onto a film strip and then transferred onto microfiche cards or roll film. In some of the apparatus disclosed in the foregoing patents, the images are developed by a cathode ray tube which exposes a master film strip that is subsequently developed and used for providing microfiche cards and/or a duplicate film strip.

OBJECTS OF THE INVENTION

It is an object of the invention to provide a new and improved film developing system for microimage recording apparatus and more particularly a new and improved developing system for microimage recording apparatus of the type utilizing a film strip which is developed by the application of heat.

It is an object of the present invention to provide a new and improved developing system of the character described which is capable of developing latent image areas previously exposed on the film in rapid and repetitive fashion by the application of heat to the film on one side while the opposite side is positioned in a heat insulated enclosure so that the amount of heat required is minimized and adjacent areas are shielded from the heat.

It is another object of the present invention to provide a new and improved film developing system for microimage recording apparatus of the character described especially adapted to develop film of the type having a relatively high film speed such as a dry silver type film wherein latent image areas are developed by the application of heat.

Another object of the invention is to provide a new and improved film developing station of the character described especially adapted and designed for use in a self-contained, computer output on microfilm (COM), microimage recorder of the type described in copending U.S. patent application Ser. No. 787,812, filed Oct. 15, 1985.

It is yet another object of the present invention to provide a new and improved film developing system of the character described which includes a film backup system for sealingly enclosing a developing segment of the film directly opposite a heated shoe which is in contact with an opposite surface of the film strip for developing a latent image thereon.

Yet another object of the present invention is to provide a new and improved film developing system of the character described including means effective to collect any residue that may be formed on the film strip during the film developing process to thus enhance image quality.

Still another object of the invention is to provide a new and improved film developing system of the character described having a replaceable residue collector element.

Another object of the present invention is to provide a new and improved film developing system wherein a portion of the film at the developing station is substantially enclosed around a perimeter of an image area being developed to prevent the escape of any gas that may be generated or residue that may form on a film surface.

BRIEF SUMMARY OF THE INVENTION

The foregoing and other objects and advantages of the present invention are accomplished in a preferred embodiment comprising a new and improved film developing system for microimage recording apparatus of the type utilizing an elongated film strip containing latent image areas which are developed by the application of heat at a developing station. One such microimage recorder is disclosed in the aforementioned copending U.S. patent application Ser. No. 787,812, which application is incorporated herein by reference. In accordance with the present invention, the film developing system includes a pair of support elements for holding the film strip on a film path at spaced apart locations with the support elements extending transversely of the film strip on opposite sides of a previously exposed, latent image area. A developer shoe having an outwardly convex heated surface is adapted to contact a facing surface of the film between the supports and the shoe is mounted for movement between a first position spaced away from the film path and a second position wherein the film strip is tensioned between the transverse supports and is biased into intimate conforming contact against the heated convex surface of the developer shoe for a selected time period to develop the latent image area on the film strip. The developer system includes a backup assembly sealingly enclosing an opposite surface of the film strip around a perimeter of an image area being developed to retain and conserve heat generated by the developer shoe while in contact with the film. The backup assembly includes a collector element facing an area on the backside of the film in readiness to collect and retain any residue that is formed. A peripheral seal is provided around this area to minimize the escape of any gas which may be generated during the developing process until such time as the developed film strip is moved away toward a next process station.

BRIEF DESCRIPTION OF THE DRAWING

For a better understanding of the present invention, reference should be had to the following detailed description taken in conjunction with the drawings, in which.

DETAILED DESCRIPTION OF THE PREFERRED EMBODIMENTS OF THE PRESENT INVENTION

Figure 1:
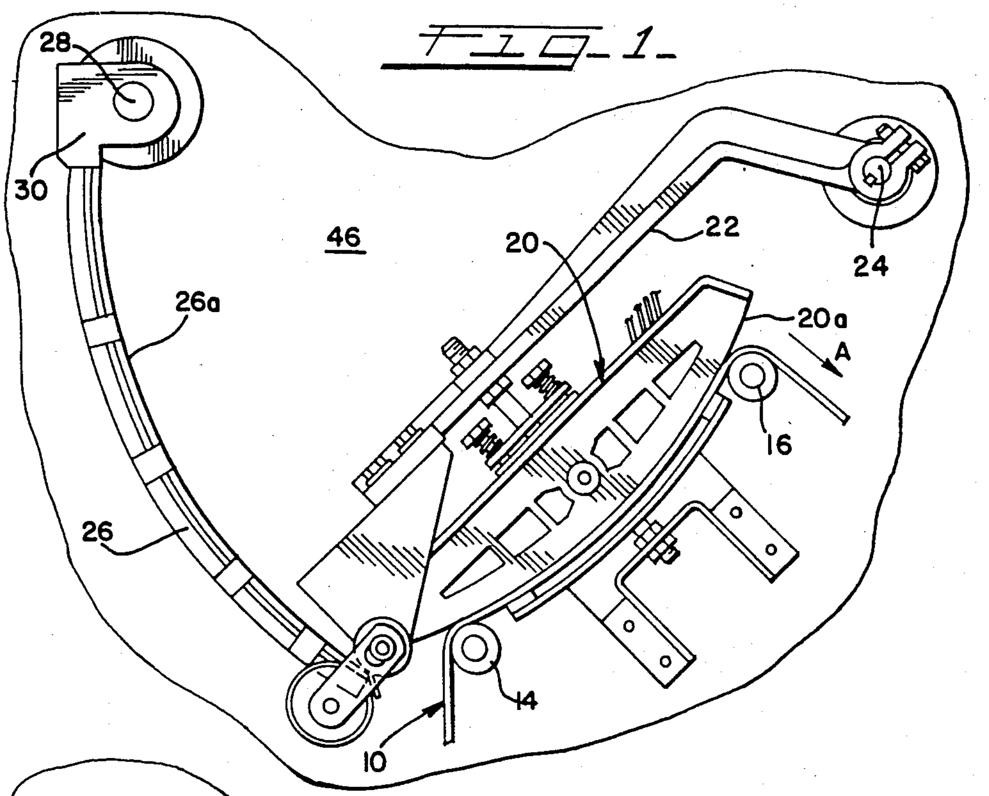
FIG. 1 is a front elevational view of a film developing station substantially in accordance with the aforementioned copending U.S. patent application Ser. No. 787,898, filed Oct. 16, 1986, which application is incorporated herein by reference.

Referring now more particularly to the drawings, in FIG. 1 is illustrated a front elevational view of a film developing station substantially in accordance with the aforementioned U.S. copending patent application, Ser. No. 787,898, wherein development of exposed latent images within each successive image area on a master film strip 10 is carried out at a film developing station by the application of heat directly against the upper surface of the film for a preselected, adjustable period of time.

In accordance with the present invention, there is provided a new and improved film developing station 12 wherein a master film strip 10 is advanced (arrow A—FIGS. 1, 2, 2A and 5) along a master film processing path until a previously exposed image area on the master film strip is centered between a pair of spaced apart support elements comprising rollers 14 and 16, with the film strip (FIG. 2A) occupying a generally planar path comprising a first position in readiness for film development. Heat is applied directly to an exposed upper surface of the film strip at the developing station 12 by a developer shoe 20 moved into contact with the film and supported on a pivot arm 22 mounted on a shaft 24.

The shaft is driven to rotate or rock the arm in opposite directions to move the developer shoe between a position spaced remotely away from the segment of film stretched between the rollers 14 and 16 and a second, film developing position (FIGS. 2, 3 and 5) wherein a convex, arcuately curved, heated undersurface 20*a* of the shoe is brought into intimate contact against the upper surface of the film and the exposed latent image area thereon. The shaft 24 is rocked back and forth around a pivot axis spaced upwardly and parallel of the upper support roll 16 to alternately move the developer shoe as disclosed between a remote position and a film developing position (FIGS. 2 and 5).

In order to shield the film strip 10 from unwanted or spurious heat and in particular to shield the segment of the master film strip extending between the spaced apart rollers 14 and 16 (FIG. 2A) from radiant heat and/or heated air generated at the surface 20*a* of the developer shoe 20, while the shoe is spaced upwardly away from the film strip in a remote position, a curved heat shield 26 is interposed between the heated surface 20*a* of the shoe and the upwardly facing, exposed surface of the master film. The heat shield 26 is formed with a layer of insulating material 26*a* on the upper face thereof and is generally curved to match the lower, curved, convex surface 20*a* of the heated developer shoe 20.

The heat shield is supported from one end for pivotal movement about a pivot axis spaced upwardly away from and parallel to the lower support roller 14 and is spaced outwardly of a free outer end portion of the developer shoe 20. An inner end portion of the heat shield is connected to a spindle 28 by a bracket 30 and the heat shield is biased in a counterclockwise direction towards a heat shielding position directly interposed between the developer shoe 20 and the master film strip 10 by means of a coil spring. The spring has convolutions mounted on spindle and opposite end legs of the spring are keyed to the spindle and bracket, respectively, to effect the counterclockwise bias as more fully set forth in copending application Ser. No. 787,898.

Figure 2:
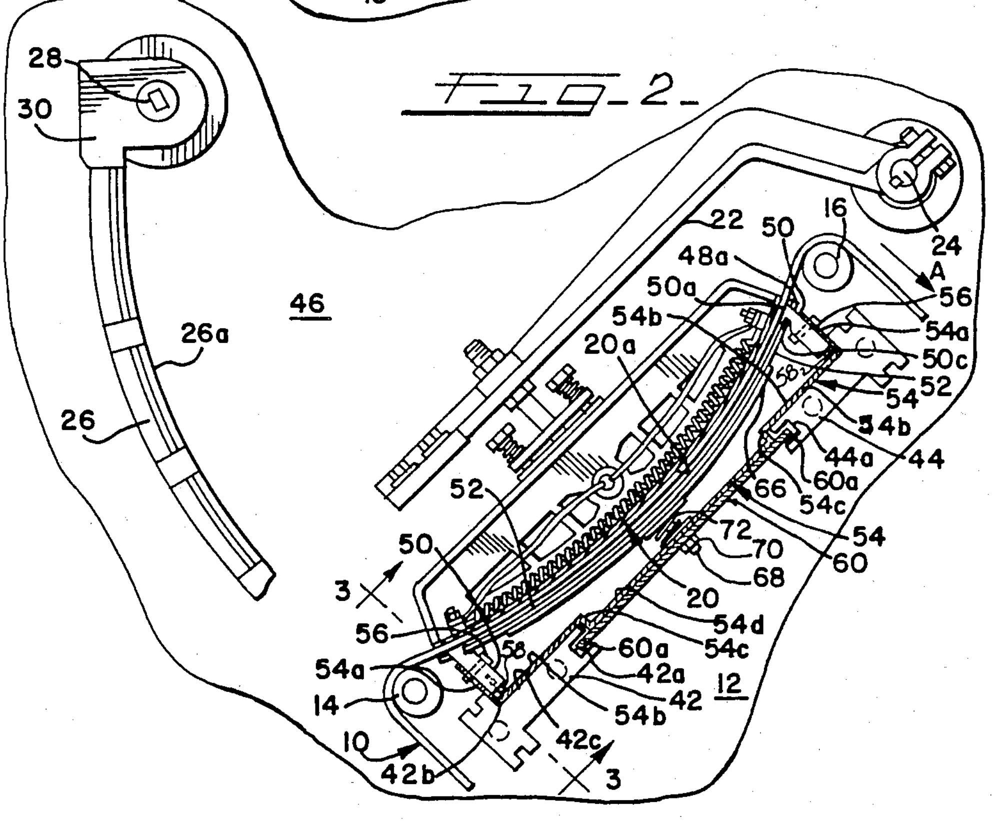
FIG. 2 is a front elevational view of a new and improved film developing station constructed in accordance with the features of the present invention.
Figure 5:
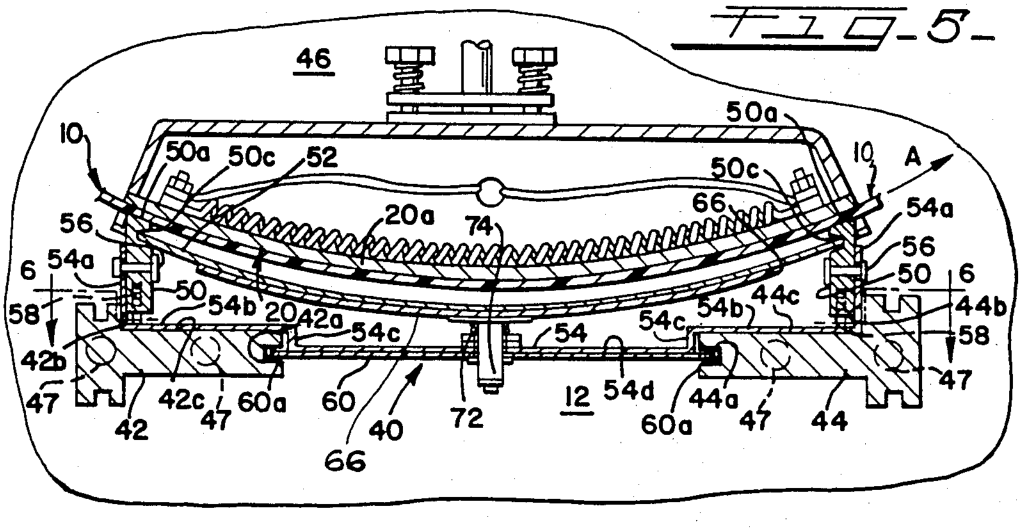
FIG. 5 is a longitudinally-extending, vertical cross-sectional view of the film developing station taken substantially along lines 5—5 of FIG. 3.
Figure 3:
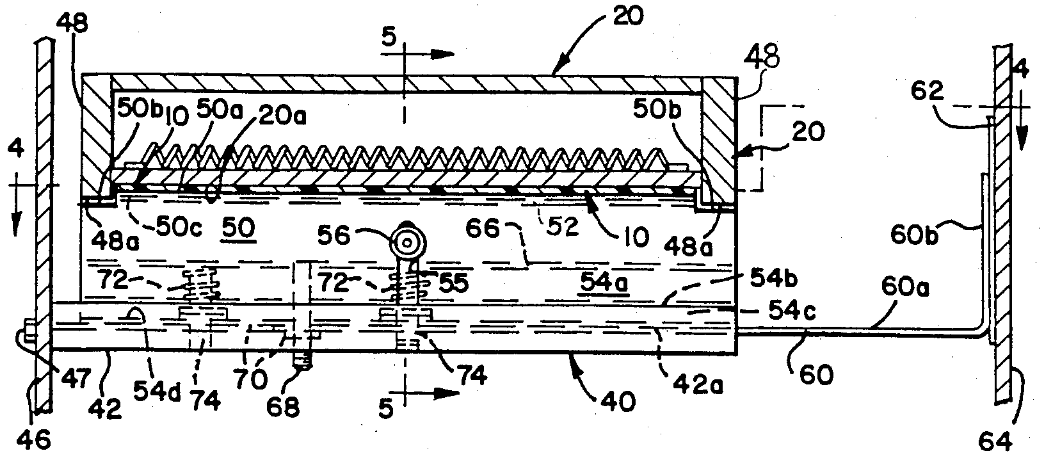
FIG. 3 is a transverse cross-sectional view of the film developing station taken substantially along lines 3—3 of FIG. 2.

In accordance with the present invention, the new and improved film strip developing station 12 includes a curved, backup assembly 40 of generally concave shape adapted to face and encloses a portion of the underside of the master film strip 10 between the rollers 14 and 16 while the film strip is in a film developing position (FIGS. 2, 3 and 5). In the developing position, the film is subjected to increased tension so as to conform tightly to the arcuately curved, convex heated surface 20*a* of the developer shoe 20. The backup assembly is positioned directly between the support rollers 14 and 16 and is slidably mounted on a pair of spaced apart guides 42 and 44 attached to a vertical chassis plate 46 of the microimage recorder by cap screws 47. These slides project outwardly of the chassis plate in cantilevered perpendicular alignment.

The backup assembly 40 is dimensioned and precisely aligned to match the film strip area engaged by the heated surface 20*a* of the developer shoe 20 when the shoe is in the film developing position as shown in FIGS. 2 and 3. When the backup assembly is in a fully inserted position on the support slides, a peripheral heat seal is established around the edges of the developing latent image area on the film strip 10 and the underside of the film strip (FIG. 3) is completely sealed off and enclosed, both to minimize heat loss and to entrap any solid residue and/or gas that is generated at the surface of the film during the development process.

Figure 4:
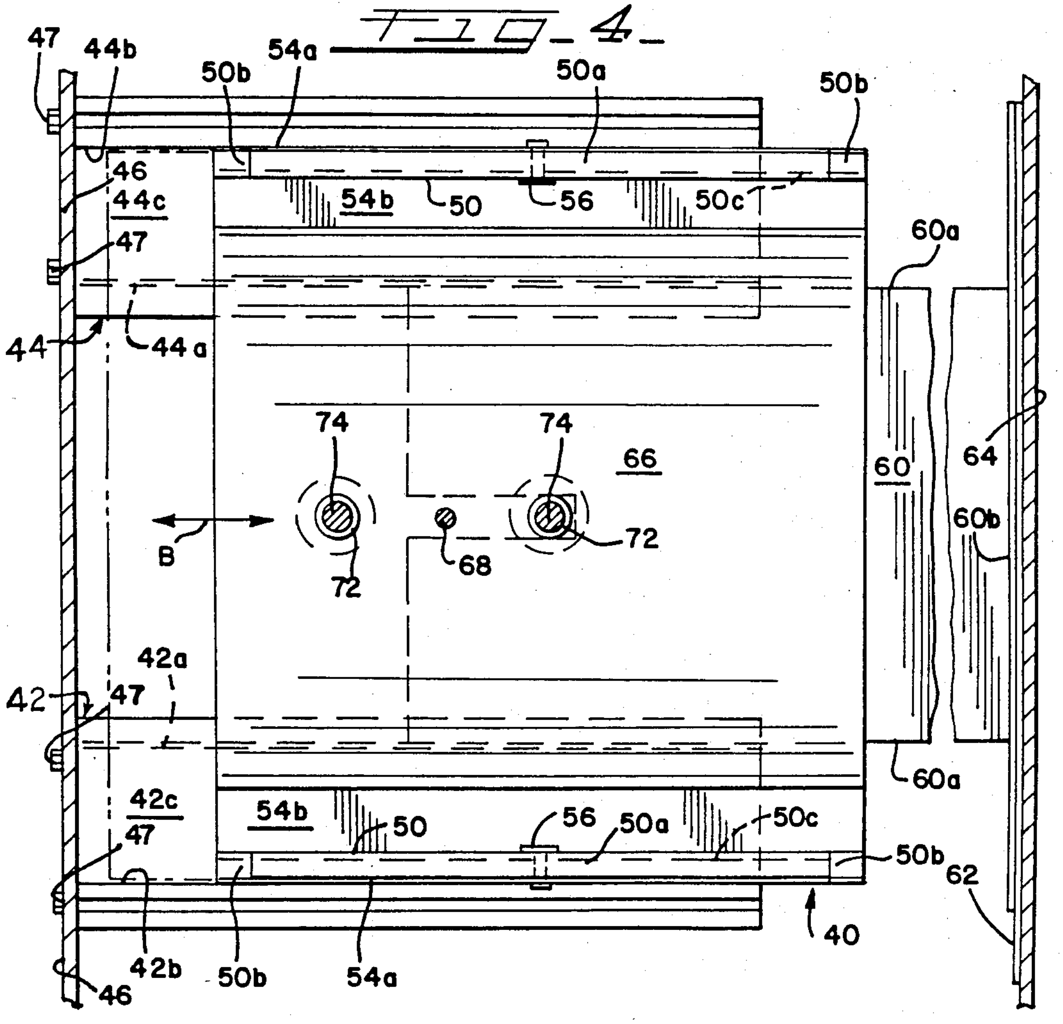
FIG. 4 is a longitudinal cross-sectional view of the film developing station taken substantially along line 4—4 of FIG. 3.

The peripheral heat seal is formed along opposite longitudinal edges of the film strip 10 by a pair of depending lower edge portions 48*a* on parallel, side wall elements 48 of the developer shoe 20, when the shoe is seated in the film developing position as shown in FIG. 3 with the heated undersurface 20*a* in contact against the upper surface of the film strip. The seal is continuous around all four sides comprising the entire periphery of the latent image area being developed. A pair of seal strips 50, each having a beveled upper edge 50*a* are provided to extend transversely across the film strip on opposite sides of the image area directly between the depending edges 48*a* of the side wall elements of the developer shoe 20. Preferably the transverse seal strips 50 are formed of strong, hard, smooth surfaced plastic material and as shown in FIGS. 3 and 4, each strip is formed with a pair of shallow recesses 50*b* adjacent opposite ends of the upper edge surface 50*a* to accommodate the depending edges 48*a* of the side walls 48 of the developer shoe 20.

Figure 2A:
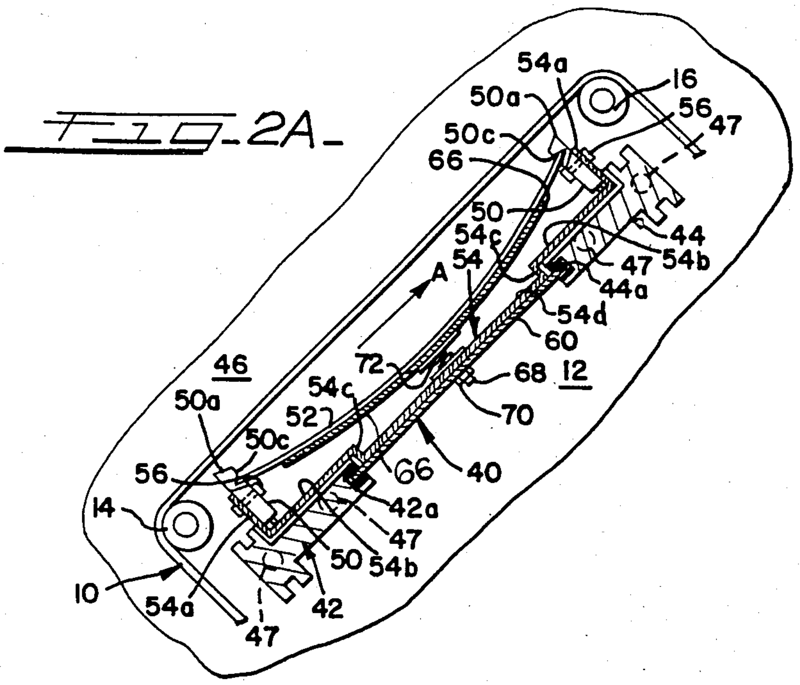
FIG. 2A is a fragmentary front elevational view of the film developing station of FIG. 2 showing the operative components thereof in a different operative position.

Each seal strip 50 is also formed with an elongafed groove 50*c* on an inside face spaced downwardly below and parallel of the upper edge 50*a* in order to slidably receive a lateral edge portion of a replaceable collector element 52. Preferably the collector element is formed of relatively stiff paper having a somewhat roughened upper surface designed to collect and hold any solid residue that may be formed on the bottom surface of the film strip during the heat development process. As best shown in FIGS. 2A and 5, the thin sheet-like collector element 52 is rectangular in shape and is dimensioned so as to curve downwardly in spaced apart relation to the undersurface of the film strip 10 when the collector sheet is fully inserted into position with opposite transverse edges seated in the grooves 50*c* of the seal strips 50.

When a collector element 52 begins to accumulate substantial deposits of residue dropping off from the undersurface of the film strip 10, the dirty element is easily removed and replaced with a clean element by sliding the old element outwardly of the edge grooves 50*c* of the seal strips 50 and then sliding a new collector element inwardly into place with its transverse edges engaged in the grooves and the main body portion of the filter sheet bowed downwardly in a concave configuration as shown, spaced just below the film strip.

Each seal strip 50 is attached intermediate its ends to a flange 54*a* formed along the edge of a generally channel-shaped base 54 formed of thin sheet metal and supported from the guides 42 and 44. Fasteners 56 are provided to interconnect the strips 50 and the respective flanges 54*a* and the shank of the fastener extends through a slot 55 (FIG. 3) provided in each flange perpendicular to the upper edge thereof.

The channel base 54 includes a pair of outer bottom segments 54*b* integrally joining and at right angles to the edge flanges 54*a* and along the inner edges, the bottom segments are integrally joined to short, downwardly extending inner flanges 54*c* at right angles to the bottom. The base also includes a central lower bottom wall 54*d* integrally joined along opposite edges to short, inner flanges 54*c*.

The strips 50 are biased upwardly of the outer bottom segments 54*c* of the base 54 by spring biased plunger assemblies 58 (FIG. 3), which assemblies are mounted in bores provided in the strips adjacent opposite outer end portions on the underside. The plungers project downwardly to engage the bottom segments 54*c* and thereby bias the strip upwardly toward the film. The seal strips 50 also may pivot about the centrally located fastener 56 which are slidably disposed in the slots 55 so that the upper sealing edges 50*a* can precisely conform to the underside of the film strip 10 to provide a gas tight, pinching seal while the developer shoe 20 is engaged against the film strip 10 for heat developing as shown in FIGS. 3 and 5.

Figure 6:
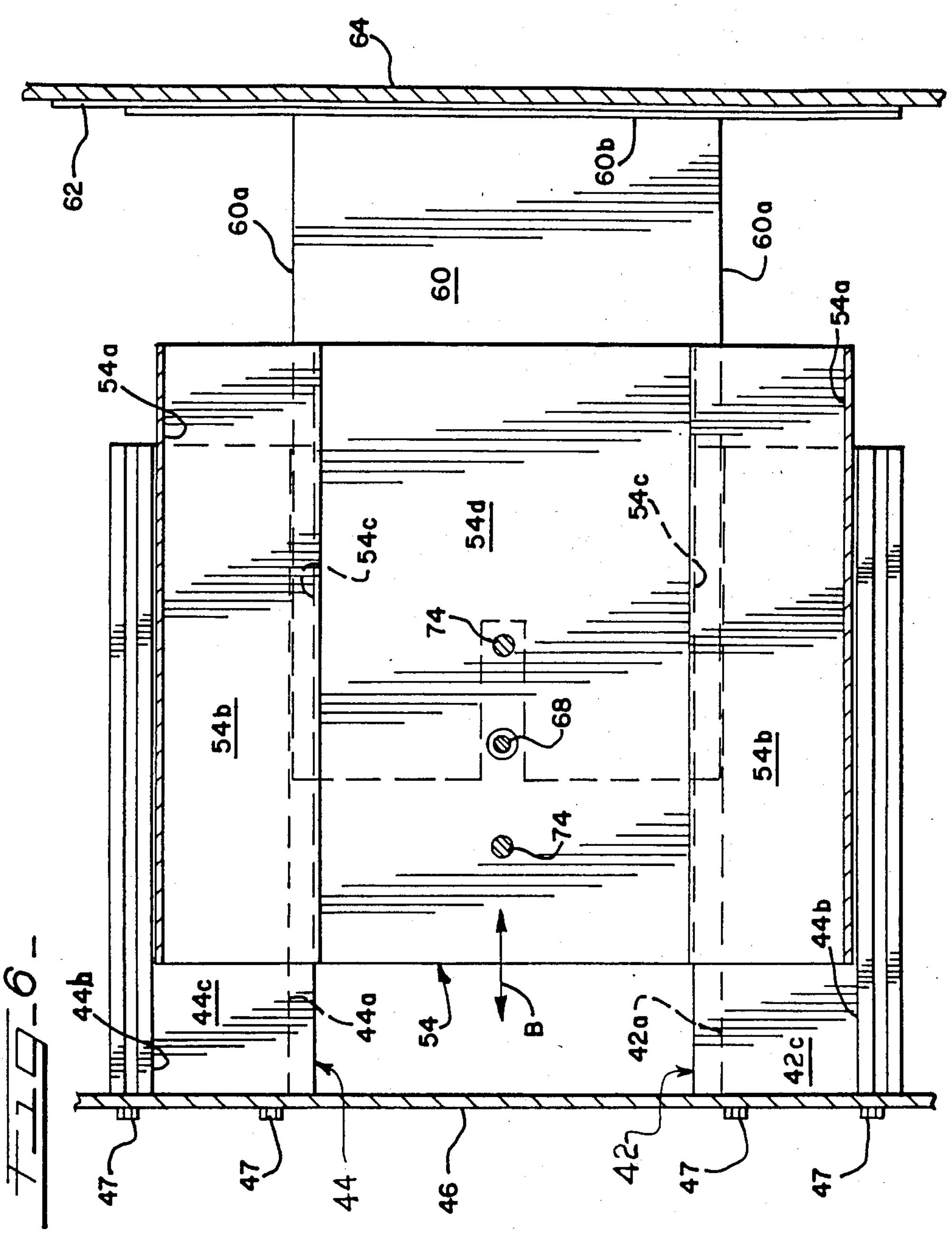
FIG. 6 is a longitudinal cross-sectional view similar to FIG. 4 taken substantially along lines 6—6 of FIG. 5.

The channel-shaped base 54 is attached to and supported on a slide member 60 formed of sheet metal and rectangular in shape for sliding movement therewith (arrow B— FIGS. 5 and 6) toward and away from the chassis wall 46 in a direction perpendicular thereto. Opposite edge portions 60*a* of the slide 60 project outwardly of the flanges 54*c* of the base 54 and are spaced below and parallel of the outer bottom segments 54*b*. The edge portions 60*a* of the slide member are mounted to slide along grooves 42*a* and 44*a* provided in facing inner edges of the respective guides 42 and 44. When the edge portions 60*a* are inserted in the grooves 42*a* and 44*a* adjacent the outer free ends of the guides 42 and 44, precisely guided alignment is provided as the slide 60 is moved inwardly to position the collector element 52 directly below the film strip 10 as shown in FIG. 3. The slide 60 is provided with an upstanding flange 60*b* for supporting an outer plate 62. The plate provides a convenient handle for inserting and removing the slide 60 from the support guides 42 and 44. The slide 60 is in a fully inserted position (FIG. 3) when an outer cabinet door 64 is fully closed and parallel with the chassis 46 with the inside face of the door bearing against the handle plate 62.

In order to resiliently support and back up the central portion of the collecting element 52 so that the transverse edges do not become disengaged from the slots 50*c* of the seal strips 50, a concavely curved, rectangular backing member 66 formed of sheet metal is mounted on the base 54. The backer 66 is provided with a depending threaded pin 68 which projects downwardly from the underside and is extended through an opening provided in the base. A stop nut and washer 70 are threaded onto the lower end portion of the threaded pin which extends beneath the bottom section 54*d* of the base and the stop nut limits the amount of upward travel of the curved backer 66 so that the collector paper 52 does not touch the undersurface of the film strip 10.

A pair of bias springs 72 are provided on opposite sides of the threaded pin 68 to resiliently bias the backer 66 upwardly from the base 54 toward the film strip. Each spring is centered around a pin 74 depending downwardly of the backer 66 and extending through an opening in the base bottom 54*d*. Thus, the backer 66 is supported from the base 54 in a resilient, floating manner to provide support for the central portion of the thin collector element 52 to prevent disengagement of the edges from the slots 50*c* of the seal strips 50.

It should be noted that the edge flanges 54*a* of the base 54 are guided in sliding engagement by inside facing surfaces 42*b* and 44*b* of the respective guides 42 and 44, and that the outer bottom segments 54*b* of the base are supported to slide on flat surfaces 42*c* and 44*c* of relatively large area on the guides. This support arrangement provides for low surface pressures and minimizes edge binding of the slide edges 60*a* in the grooves 42*a* and 44*a* as the backup assembly 40 is installed and removed for replacement of the collection element 52 from time to time.

The heat sealing strips 50 tend to minimize convection heat transfer longitudinally along the master film strip 10 in either direction beyond and outside of the image area. In addition, the backup assembly 40 also diminishes convection air flow up along the inclined face of the film strip, thereby to help insure a uniform temperature distribution on the image area between the rollers 14 and 16 during the developing process, and thus providing a uniformly developed image density. The seal strips 50 are preferably formed of heat insulating material and along with the other components of the backup assembly 40 help to conserve and concentrate the heat generated by the heated surface 20*a* of the developer shoe 20 so that heat is not wasted and so that precise timing of the development cycle can result in a uniform development of successive image areas on the master film strip time after time.

As soon as a film developing cycle is completed, the developer shoe pivot arm 22 is rotated in a clockwise direction from the developing position of FIG. 2 to a remote position wherein the shoe is generally horizontal and spaced well above the upper support roll 16. After a short time delay period following the application of heat for development in order to allow the film strip to cool, the master film strip 10 is advanced in the direction of arrow A until a next successive image area is positioned on the film processing path between the supporting rolls 14 and 16 in readiness for developing the next exposed latent image area thereon. Previously, as the developer shoe 20 was moved toward the remote position, the heat shield 26 automatically was pivoted in a counterclockwise direction from the retracted position of FIG. 2 into the heat shielding position wherein the heated surface 20*a* is shielded from the freshly exposed image area on the master film strip presently moving into position between the rolls 14 and 16 in preparation for development.

As set forth more fully in U.S. application Ser. No. 787,898, incorporated herein by reference, a mechanical interconnection between the developer shoe and the heat shield is provided which may comprise a cam and follower system including a pair of cam rollers spaced on opposite sides of a cam track of curved configuration formed on one longitudinal edge of the heat shield structure. A large diameter cam follower roller is mounted to ride along the underside of the cam track and encounters an end stop at the outer end when the heat shield is in the fully retracted position as shown in FIG. 1. The large cam follower roller is supported on an axle mounted adjacent the free outer end portion of a link member, which is slidably and pivotally connected to a spindle. The spindle also supports a small diameter cam follower and is mounted to project outwardly from a bracket secured to the outer end of the arm 23 with cap screws. The link is formed with an elongated slot to permit angular as well as longitudinal adjustment of the link on the spindle as relative movement between the developer shoe 20 and the heat shield 26 takes place during a cycle of operation.

The mechanical interconnecting arrangement between the developer shoe and the heat shield results in a smooth and automatic operation wherein an initiating movement of the developer shoe from a remote position toward the film developing position of FIG. 2 automatically results in retraction of the heat shield 26 out of the heat shielding position to the fully retracted position of FIG. 2. After a heat developing cycle has been completed, movement of the developer shoe from the heat developing position back toward the remote position automatically results in movement of the heat shield from the retracted position back to the heat shielding position. The stop element at the free end of the curved cam track on the heat shield coupled with a bias spring insures that the developer shoe and heat shield move in the prescribed interrelationship and permits rapid movements to occur without danger of the mechanical interconnecting linkage between these components becoming uncoupled.

Precise, adjustable positioning of the backup assembly 40 and the seal strips 50 thereon coupled with the resilient mounting arrangement of the developer shoe 20 on the arm 22 provides for smooth operation of the system with minimal danger of any tearing or damage to the master film strip 10 during the developing process. Moreover, the desired amount of contact pressure between the heated surface 20*a* of the developer shoe and the facing surface of the master film strip on the segment between the support rolls 14 and 16 may be accurately controlled and adjusted to achieve uniform film developing characteristics as successive image areas are developed during prolonged operation of the microimage recorder. Predevelopment, over-development or under-development of the film is greatly reduced and eliminated by the seal strips 50 and the novel backup assembly 40 which prevent the escape of heat and gas during the development process and which collect any solid residues that may be formed on the film.

The heated surface of the developer shoe is maintained in a relatively constant, selectively adjustable, temperature range. The surface is electrically heated by current supplied through internal wires and the amount of electrical power that is supplied is regulated closely to a value selected and responsive to a thermostatically controlled supply circuit. In addition, the time period that the heated shoe is in contact with the film strip is selectively adjustable and accurately controlled.

As set forth in the copending U.S. patent application Ser. No. 787,898, reciprocating pivotal or rocking movement of the shaft 24 controlling the position of the developer shoe 20 is achieved by a drive mechanism including a shaft which is supported in a bearing mounted on the chassis plate 46 and projecting through an opening therein beyond the rearward face of the chassis. A "Geneva" gear drive sysetm as described in said application is utilized to drive the shaft in precision synchronism with the other components of the microimage recorder utilizing the improved development station 12 of the present invention.

Although the invention has been described in terms of a preferred embodiment, it will be obvious to those skilled in the art that many alterations and modifications may be made without departing from the invention. Accordingly, it is intended that all such alterations and modifications be considered as within the spirit and scope of the invention as defined by the appended claims.

I claim:

1. In a microimage recording apparatus of the type including an elongated film strip movable under tension along a film path, said film strip of the type utilizing heat for developing latent image areas formed on said film strip at an exposure station, an improved developing station comprising:

means for supporting said film strip along said path between spaced apart support lines extending transversely of said film strip on opposite ends of a previously exposed latent image area thereon in position ready for developing;

developer shoe means having an outwardly convex heated surface adapted to contact a facing surface of said film strip between said support lines for developing said latent image area;

said developer shoe means mounted for movement between a first position spaced away from said film path and a second, film developing position wherein said film strip is tensioned between said transverse support lines and is biased into intimate conforming heated contact against said convex surface for a selected time period to develop said latent image area; and backup means between said support lines spaced from and adjacent an opposite surface of said film strip for retaining heat provided by said developer shoe means while in contact with said film strip, said backup means including a replaceable collection element adapted to collect and retain any residue formed on said film strip at said developing station.

2. The developing station of claim 1 wherein:

said convex heated surface of said developer shoe means is positioned to increase said tension on said film strip between said support lines as said heated surface moves to engage said facing surface of said film strip for providing said intimate conforming heated contact for developing said latent image area;

said developer shoe means including parallel side members spaced outwardly of opposite edges of said film strip and depending outwardly of said convex heated surface for enclosing a portion of said film strip containing a latent image area in said second position between said transverse support lines during a film developing cycle at said station.

3. The developing station of claim 2 wherein:

said backup means includes a concave wall spaced apart from and facing said opposite surface of said film strip between said support lines for supporting said collection member.

4. The developing station of claim 1 wherein:

said supporting means includes a pair of guide rollers engaging said film strip forming said transverse support lines, said guide rolls positioned to maintain said film strip out of contact with said backup means during movement along said film path when said developer shoe means is in said first position.

5. The developing station of claim 4, wherein said backup means includes a pair of elongated sealing elements spaced apart along said film path and spaced inwardly of said rollers, said sealing elements extending transversely of said film strip and positioned for sealing engagement with said opposite surface of said film strip while said latent image area is being developed by heated intimate contact with said developer shoe means in said second, film developing position at said station.

6. The developing station of claim 5, wherein:

said backup means includes a guide in fixed relation to said film path and a carriage slidable on said guide between a first position thereon for holding said collection element in a residue collecting position adjacent said film strip at said station and a second position remote from said guide for removal and/or replacement of said collection element.

7. The developing station of claim 6, wherein said elongated sealing elements are mounted on opposite sides of said carriage and are formed with elongated sealing surfaces along outer edges thereof extending transversely across said opposite surface of said film strip in sealing engagement therewith while said film strip is in said second, film developing position.

8. The developing station of claim 7, wherein:

said collection element is supported along opposite ends adjacent said sealing surfaces of said elongated sealing elements.

9. The developing station of claim 8, wherein:

said elongated sealing elements are formed with facing elongated grooves spaced from said sealing surfaces thereof for slidably receiving opposite ends of said collection element.

10. The developing station of claim 9, wherein:

said grooves are spaced apart by a distance less than the distance between said opposite ends of said collection elements whereby said collection element is biased into a concave shape facing said film strip when said opposite ends are slidably mounted in said grooves.

11. The developing station of claim 10, wherein:

said collection element comprises a thin sheet of material having an uneven surface facing said film strip for collecting and retaining residue received therefrom.

12. The developing station of claim 11, wherein:

said collection element comprises a thin sheet of paper material.

13. The developing station of claim 7, wherein:

said elongated sealing surfaces of said sealing strips are narrow in width and are aligned to lie in abutting substantially tangent relationship to the curvature of said film strip on said opposite side thereof while engaged by said developing shoe in said second, film developing position.

14. The developing station of claim 13, wherein:

said developer shoe means includes a pair of parallel side members spaced outwardly of opposite edges of said film strip said side members extend outwardly beyond the opposite side of said film strip to enclose said opposite edges thereof when said shoe means is in said second, film developing position; and wherein said elongated sealing strips are positioned to extend transversely between said side members of said developer shoe means while said elongated sealing surfaces of said sealing strips are engaging said opposite side of said film strip, whereby said sealing strips and said side members enclose the periphery of said latent image area of said film strip during said developing cycle at said station.

15. The developing station of claim 14, wherein:

said replaceable collection element is enclosed around the periphery thereof by said strips and said side members of said-developer shoe means when said shoe means is positioned in said second film developing position during said developing cycle at said station.

16. The developing station of claim 6, wherein:

said carriage is provided with a concave wall member facing said collection element intermediately of said sealing elements for supporting a central portion of said collection element spaced inwardly of said sealing elements.

17. The developing station of claim 16, wherein:

said carriage comprises a channel shaped member having a web supporting said concave wall member and a pair of flanges joining said web supporting said elongated sealing elements.

18. The developing station of claim 17, wherein:

said concave wall member is supported from a central portion of said web and is resiliently biased adjacent said central portion toward said collection element.

19. The developing station of claim 17, wherein:

said elongated sealing elements are mounted for pivotal movement on said flanges of said channel member intermediate opposite ends of said sealing elements about axes extending longitudinally of said film path.

20. The developing station of claim 18, including:

stop means for limiting the outwardly biased movement of said concave wall member from said web.

* * * * *